United States Patent
Hurlock (12)

(10) Patent No.: US 7,077,054 B1
(45) Date of Patent: Jul. 18, 2006

(54) TEA STRAINER

(76) Inventor: James A. Hurlock, 7646 SE. 17th, Portland, OR (US) 97202

( * ) Notice: Subject to any disclaimer, the term of this patent is extended or adjusted under 35 U.S.C. 154(b) by 407 days.

(21) Appl. No.: 10/428,413

(22) Filed: May 3, 2003

(51) Int. Cl.
*A47J 31/00* (2006.01)

(52) U.S. Cl. .......................... 99/323; 99/495; 210/465; 210/470

(58) Field of Classification Search ................. 99/323, 99/306, 318, 495; 100/110, 116, 234; 210/465, 210/470
See application file for complete search history.

(56) References Cited

U.S. PATENT DOCUMENTS

| | | | | |
|---|---|---|---|---|
| 2,484,461 A | * | 10/1949 | Perry, Jr. | 294/106 |
| 3,354,812 A | * | 11/1967 | Gorton, Jr. | 99/323 |
| 5,806,409 A | * | 9/1998 | Johnson et al. | 99/323 |
| 5,979,300 A | * | 11/1999 | Donovan | 99/323 |

* cited by examiner

*Primary Examiner*—Reginald L. Alexander

(57) ABSTRACT

The present invention relates to a tea strainer comprised of a perforated bowl with a cover. The bowl is connected to an elongated handle. The cover is connected to a cover shaft that is pivotally attached to the handle. The perimeter of the cover is slightly smaller than the perimeter of the bowl so that the cover can be extended into the bowl to strain the tea. A retention latch is attached to the front of the bowl to keep the cover from opening.

20 Claims, 3 Drawing Sheets

TEA STRAINER

BACKGROUND OF THE INVENTION

1. Field of the Invention

The present invention relates to a tea strainer for use in connection with straining the liquid from packaged tea bags. The tea strainer has particular utility in connection with providing one step steeping of tea as well as straining the liquid from tea bags.

2. Description of the Prior Art

Tea strainers are desirable for straining the liquid from packaged tea bags. A person can use the tea strainer to strain tea as opposed to squeezing the teabag with his or her hands. This eliminates the mess of tea straining.

The use of tea tongs is known in the prior art. For example, U.S. Pat. No. Des. 394,588 to Joergensen discloses a tea tong. However, the Joergensen '588 patent does not have a measuring cup bottom, and has further drawbacks of not having a cover that can extend down into the bowl.

U.S. Pat. No. 880,190 to Bultzingslowen discloses a tea strainer that strains tea. However, the Bultzingslowen patent does not have a cover that can extend down into the bowl, and additionally does not have a latch for ensuring the cover does not open on its own.

Similarly, U.S. Pat. No. 453,972 to Gray discloses a spoon that can be used to strain tea. However, the Gray '972 patent does not have a cover that can extend down into the bowl, and does not have a latch to ensure the cover does not open on its own.

Lastly, U.S. Pat. No. 2,570,521 to Chester discloses a measuring device which is used to measure coffee, tea, etc. However, the Chester '521 patent does not have a cover that can extend down into the bowl, and has the additional deficiency of not having a latch to ensure the cover does not open on its own.

While the above-described devices fulfill their respective, particular objectives and requirements, the aforementioned patents do not describe a tea strainer that allows providing one step steeping of tea as well as straining the liquid from tea bags. The present invention has a wedge-shaped cover that can extend downward into the bowl to strain the tea. The bowl that holds the tea bag has a measuring cup type bottom that is larger than the normal spoon so as to be able to hold more tea. The bowl also has a perforated mesh bottom which allows the herbs to be infused into the hot water. In addition, a retention latch is present to stop the cover from accidentally opening.

Therefore, a need exists for a new and improved tea strainer that can be used for providing one step steeping of tea as well as straining the liquid from tea bags. In this regard, the present invention substantially fulfills this need. In this respect, the tea strainer according to the present invention substantially departs from the conventional concepts and designs of the prior art, and in doing so provides an apparatus primarily developed for the purpose of providing one step steeping of tea as well as straining the liquid from tea bags.

SUMMARY OF THE INVENTION

In view of the foregoing disadvantages inherent in the known types of tea tongs now present in the prior art, the present invention provides an improved tea strainer, and overcomes the above-mentioned disadvantages and drawbacks of the prior art. As such, the general purpose of the present invention, which will be described subsequently in greater detail, is to provide a new and improved tea strainer and method which has all the advantages of the prior art mentioned heretofore and many novel features that result in a tea strainer which is not anticipated, rendered obvious, suggested, or even implied by the prior art, either alone or in any combination thereof.

To attain this, the present invention essentially comprises an elongated handle that is attached to a bowl with mesh at the bottom. A wedge-shaped cover is attached to a cover shaft. The cover shaft is pivotally attached to the handle via a pair of pivot and attachment points into which attachment tabs are placed. This allows lifting and lowering of the cover over the bowl. The cover can be extended into the bowl to strain the tea bag. A retention latch is located on the front end of the bowl to ensure that the cover does not open accidentally.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tea strainer that has all of the advantages of the prior art tea tongs and none of the disadvantages.

It is another object of the present invention to provide a new and improved tea strainer that may be easily and efficiently manufactured and marketed.

An even further object of the present invention is to provide a new and improved tea strainer that has a low cost of manufacture with regard to both materials and labor, and which accordingly is then susceptible of low prices of sale to the consuming public, thereby making such tea strainer economically available to the buying public.

Still another object of the present invention is to provide a new tea strainer that provides in the apparatuses and methods of the prior art some of the advantages thereof, while simultaneously overcoming some of the disadvantages normally associated therewith.

Even still another object of the present invention is to provide a tea strainer for providing one step steeping of tea as well as straining the liquid from tea bags. The present invention also allows for an inexpensive method of making tea concoctions. The measuring spoon can easily be used to re-steep. Loose tea or a used tea bag could be quickly and effectively drained which would prevent drips and stains on saucers, kitchen countertops, and tables. The person using this device would not have to touch the loose tea or tea bag to squeeze out the remaining liquid.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
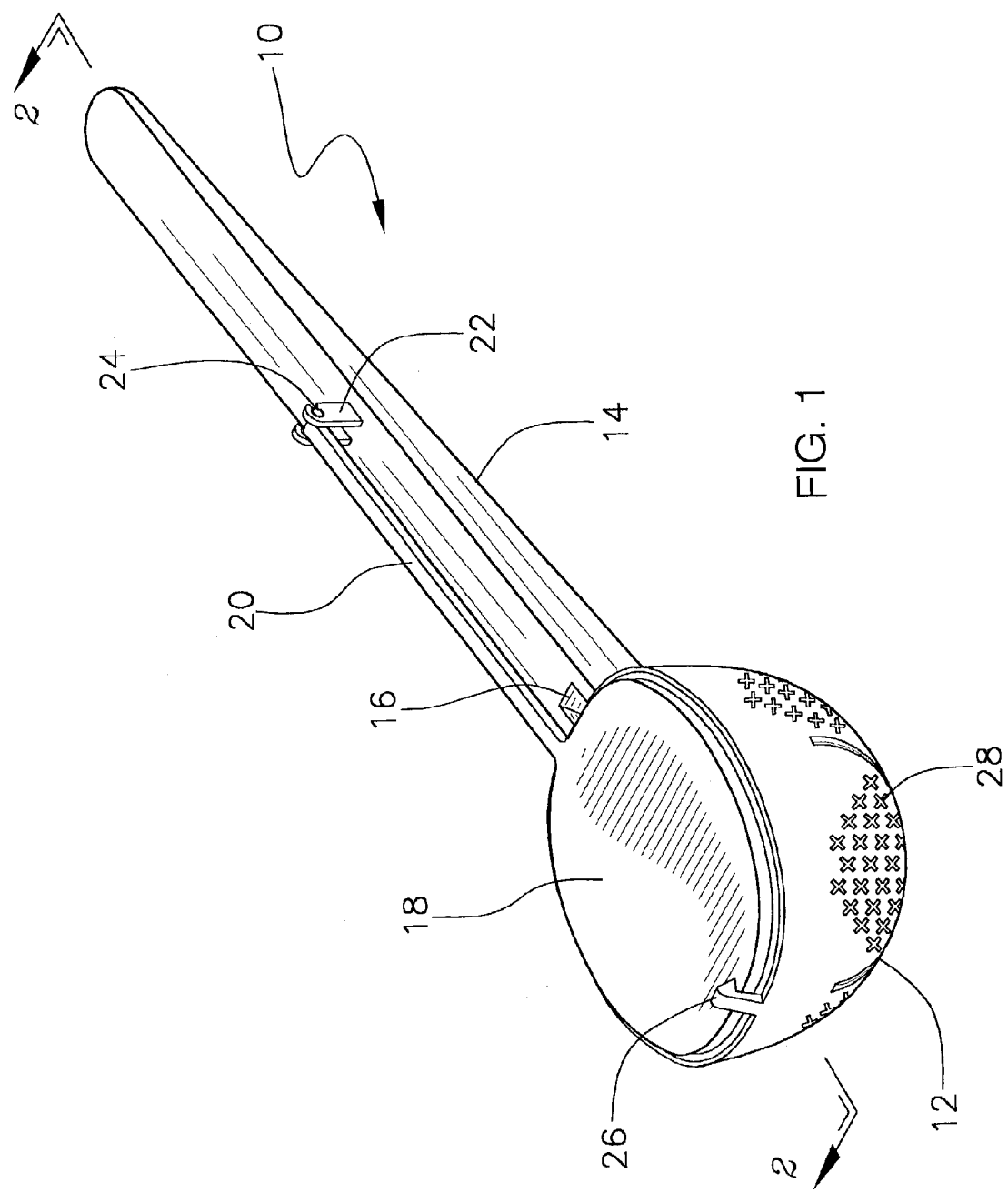
FIG. 1 is a right perspective view of the preferred embodiment of the tea strainer constructed in accordance with the principles of the present invention.

Referring now to the drawings, and particularly to FIGS. 1–4, a preferred embodiment of the tea strainer of the present invention is shown and generally designated by the reference numeral 10.

In FIG. 1, a new and improved tea strainer 10 of the present invention for straining and steeping tea is illustrated and will be described. Those skilled in the art will readily recognize that although the invention is herein described as a tea strainer, the invention may readily be used for a wide variety of liquids, including coffee. More particularly, the tea strainer 10 is comprised of a bowl 12, a handle 14, and a cover 18. The bowl 12 has a front section, a back section, an open top section, opposing side sections, and a perforated bottom section. The bowl 12 can be round or square-shaped. The perforated bottom section is made of a mesh 28. The handle 14 is elongated to reach into the bowl 12 and has a proximal and a distal end in addition to having a top and a bottom surface. The back section of the bowl 12 is attached to the proximal end of the handle 14. The top surface of the proximal end of the handle 14 has a notch 16 to ensure that the cover 18 can extend downward into the bowl 12 to strain the tea. The cover 18 is wedge-shaped and has a front end, a back end, a top surface, and a bottom surface. The back surface of the cover 18 is attached to the proximal end of a cover shaft 20. The cover shaft 20 is elongated and extends from the cover 18 back over the handle 14. A pair of hook-shaped pivot attachment points 22 extend upwardly from the top surface of the handle 14. The distal end of the cover shaft 20 has a pair of attachment point tabs 24, which are engaged with the pivot attachment points. The cover 18 can then pivotally lift upwards or downwards. The cover shaft 20 fits within the notch 16 on the handle 14 to extend the cover 18 downwards into the bowl 12 to strain the liquid from the tea. A retention latch 26 is located at the top front section of the bowl 12. This latch 26 is hook-shaped and keeps the cover 18 from opening over the bowl 12 when so engaged. The tea strainer 10 can be metal or plastic although plastic is preferred since metal can conduct heat. The tea strainer 10 can also be made in various sizes to accommodate a single cup of tea or a whole pot.

Figure 2:
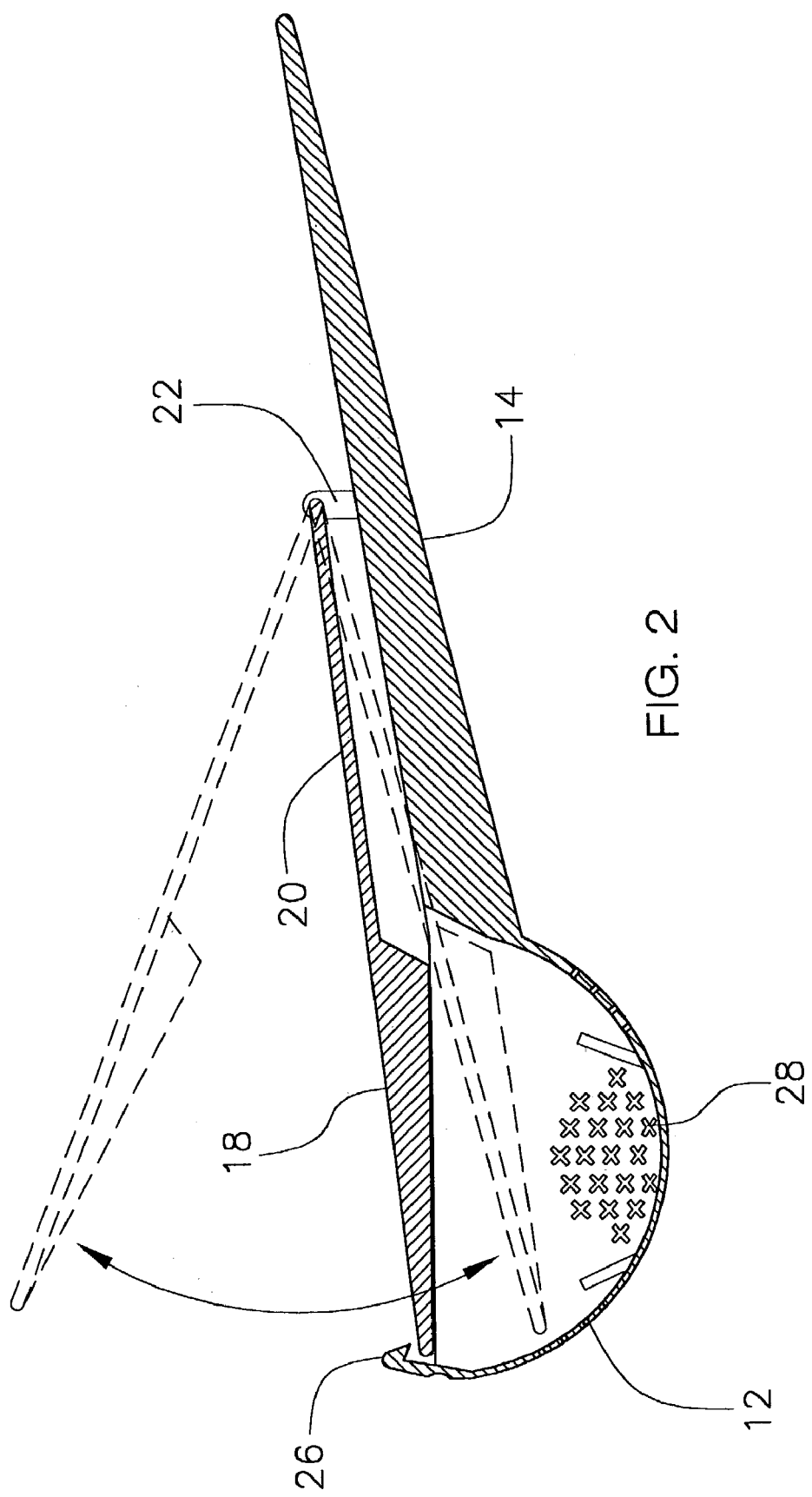
FIG. 2 is a cross sectional view of the tea strainer of the present invention taken substantially along the 2—2 line of FIG. 1.

FIG. 2 is a cross-sectional view of the tea strainer 10 showing that the cover 18 can extend downward into the bowl 12 to strain the tea. The perimeter of the cover 18 is slightly less than the perimeter of the bowl 12, which allows the cover 18 to extend downwards into the bowl 12. The cover shaft 20 pivots via the attachment point tabs 24 on the pivot attachment points 22 to lift or lower the cover 18. The cover 18 serves as a strainer to drain the remaining liquid from the tea after steeping it in the water. The handle 14 has a notch 16 on the top surface of the proximal end. The cover shaft 20 extends downwardly into the notch 16 to place the cover 18 within the bowl 12. The cover 18 can be lifted upwards or downwards. When the cover 18 is lifted upwards, a tea bag could be placed within the bowl 12 for steeping and straining. The cover 18 is pushed downward into the bowl 12 to strain the liquid from the tea bag. This figure also shows the elongated handle 14 as being wedge-shaped with the proximal end being thicker than the distal end. The proximal end of the handle 14 attaches to the back side of the bowl The cover 18 is wedge-shaped so that the back section of the cover 18 is thicker than the front section. The cover shaft 20 is aligned with the top surface of the cover 18 to provide a flat surface thereon. The angle between the cover shaft 20 and the wedge-shaped bottom section of the cover 18 is approximately one hundred degrees.

Figure 3:
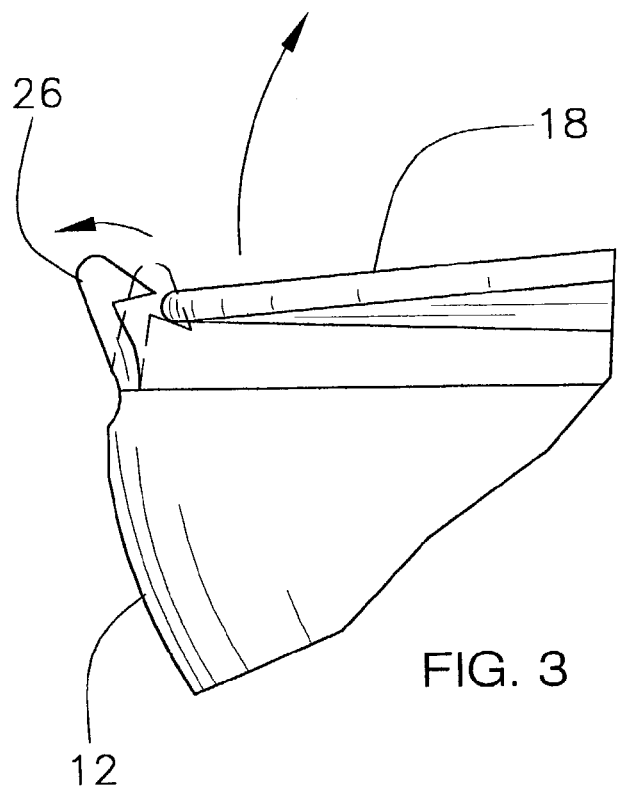
FIG. 3 is a right side view of the tea strainer of the present invention showing locking latch engaging with the steeping cover.

FIG. 3 shows the latch 26 as ensuring that the cover 18 does not open until the latch 26 is released. The latch 26 is hook-shaped and may be pulled backwards to release the cover 18 and allow it to open. When the cover 18 is open, a tea bag can be placed in the bowl 12. When the latch 26 is in place on the cover 18, the cover 18 cannot be lifted from the bowl 12. The latch 26 could be made of a heavyweight plastic or metal. Similarly, the cover 18 can be made of a plastic or a metal, however, plastic may be preferable since metal conducts heat. The latch 26 should be somewhat flexible to allow the latch 26 to be pulled backwards to release the cover 18.

Figure 4:
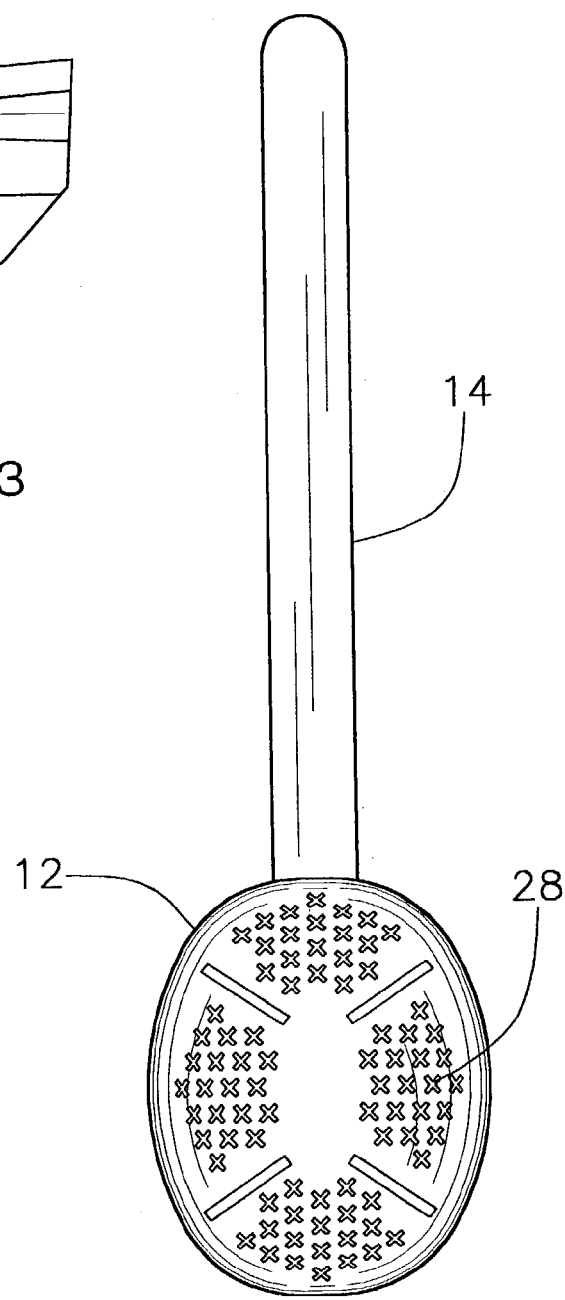
FIG. 4 is a bottom plan view of the tea strainer of the present invention showing the steeping mesh.

FIG. 4 shows the mesh 28 on the bottom of the bowl 12 that allow the tea to be strained into the hot water. The mesh 28 allows the hot water to infuse the herbs. The mesh 28 can be made of a material such as plastic, nylon, or metal. Plastic or nylon would be preferable since metal is a conductor of heat.

While a preferred embodiment of the tea strainer has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tea strainer comprising:
   a bowl having a front section, a back section, a perforated bottom section, opposing side sections and an open top section with a rim;
   an elongated handle having a top portion, a bottom portion, opposing side portions, a proximal end and a distal end, wherein said proximal end of said handle is fixedly attached to said back portion of said bowl and wherein said top portion of said proximal end of said handle defines a notch therein;
   a cover having a top section, a bottom section, opposing side sections, a front section, and a back section;
   a cover shaft having opposing sides, a top surface, a bottom surface, a proximal end and a distal end wherein said proximal end is attached to said back section of said cover, wherein said notch receives said cover shaft so that said cover extends downwards into said bowl;
   a pair of pivot attachment points having a hook shape wherein each of said pivot attachment points extend upwardly from said top surface of said handle;
   a pair of attachment point tabs wherein each of said tabs protrudes outwardly from each opposing side of said distal end of said cover shaft and wherein each of said attachment point tabs is pivotally engaged with one of said pair of pivot attachment points;
   a retention latch wherein said latch is fixedly attached to the front section of said bowl.

2. The apparatus of claim 1, wherein said bottom of said bowl is made of mesh.

3. The apparatus of claim 1, wherein said handle is wedge-shaped.

4. The apparatus of claim 1, wherein the proximal end of said handle is thicker than the distal end of said handle.

5. The apparatus of claim 1, wherein said cover has a perimeter that is slightly less than the perimeter of said bowl.

6. The apparatus of claim 1, wherein said bottom section of said cover is wedge-shaped.

7. The apparatus of claim 1, wherein said top section of said cover is flat.

8. The apparatus of claim 1, wherein said back section of said cover is thicker than said front section of said cover.

9. The apparatus of claim 1, wherein said latch is hook shaped.

10. A tea strainer comprising:
    a circular bowl having a front side, a back side, opposing side sections, a perforated bottom side, and an open top with a rim;
    an elongated wedge-shaped handle having a top portion, a bottom portion, opposing side portions, a proximal end and a distal end, wherein said proximal end of said handle is fixedly attached to said back section of said bowl and wherein said top portion of said proximal end of said handle defines a notch therein;
    a cover having a top section, a bottom section, opposing side sections, a front section and a back section wherein the perimeter of said cover is slightly smaller than the perimeter of said top of said bowl;
    a cover shaft having a top surface, a bottom surface, opposing side surfaces, a proximal end and a distal end wherein said proximal end is attached to said back section of said cover, wherein said notch receives said cover shaft so that said cover extends downwards into said bowl;
    a pair of pivot attachment points having a hook shape wherein each of said pivot attachment points extend upwardly from said top surface of said handle;
    a pair of attachment point tabs wherein each of said tabs protrudes outwardly from each opposing side of said distal end of said cover shaft and wherein each of said attachment point tabs is pivotally engaged with one of said pair of pivot attachment points;
    a retention latch wherein said latch is fixedly attached to the front section of said bowl and wherein said latch is hook-shaped.

11. The apparatus of claim 10, wherein said bottom of said bowl is made of mesh.

12. The apparatus of claim 10, wherein the proximal end of said handle is thicker than the distal end of said handle.

13. The apparatus of claim 10, wherein said cover is wedge-shaped.

14. The apparatus of claim 10, wherein said top section of said cover is flat.

15. The apparatus of claim 10, wherein said back section of said cover is thicker than said front section of said cover.

16. A tea strainer comprising:
    a square-shaped plastic bowl having a front side, a back side, a mesh bottom side, and an open top with a rim;
    an elongated wedge-shaped handle having a top portion, a bottom portion, opposing side portions, a proximal end and a distal end, wherein said proximal end of said handle is fixedly attached to said back section of said bowl and wherein said top portion of said proximal end of said handle defines a notch therein;
    a cover having a top section, a bottom section, opposing side sections, a front section, and a back section wherein the perimeter of said cover is slightly smaller than the perimeter of said top of said bowl;
    a cover shaft having a top surface, a bottom surface, opposing side surfaces, a proximal end and a distal end wherein said proximal end is attached to said back section of said cover, wherein said notch receives said cover shaft so that said cover extends downwards into said bowl;
    a pair of pivot attachment points having a hook shape wherein each of said pivot attachment points extend upwardly from said top surface of said handle;
    a pair of attachment point tabs wherein each of said tabs protrudes outwardly from each opposing side of said distal end of said cover shaft and wherein each of said attachment point tabs is pivotally engaged with one of said pair of pivot attachment points;
    a hook-shaped retention latch wherein said latch is fixedly attached to the front section of said bowl.

17. The apparatus of claim 16, wherein the proximal end of said handle is thicker than the distal end of said handle.

18. The apparatus of claim 16, wherein said bottom section of said cover is wedge-shaped.

19. The apparatus of claim 16, wherein said top section of said cover is flat.

20. The apparatus of claim 16, wherein said back section of said cover is thicker than said front section of said cover.

* * * * *